United States Patent [19]
Smith et al.

[11] 3,737,959
[45] June 12, 1973

[54] PIPE CLAMP MADE OF NON-CAST MATERIALS

[75] Inventors: Telford L. Smith, Millbrae; Frank E. Turner, San Mateo, both of Calif.

[73] Assignee: Smith-Blair Inc., Pittsburgh, Pa.

[22] Filed: Oct. 29, 1971

[21] Appl. No.: 193,774

[52] U.S. Cl. ................................................. 24/279
[51] Int. Cl. ............................................. B65d 63/06
[58] Field of Search ..................... 138/99; 285/365, 285/366, 367, 410, 411; 24/279, 280, 281, 282, 284

[56] References Cited
UNITED STATES PATENTS

| | | | |
|---|---|---|---|
| 1,447,956 | 3/1923 | Blaise | 24/281 |
| 1,629,246 | 5/1927 | Arrington | 24/280 |
| 2,002,141 | 5/1935 | Dumke | 24/279 X |
| 2,231,512 | 2/1941 | Smith | 285/410 X |
| 2,271,425 | 1/1942 | Harris | 285/367 |
| 2,853,762 | 9/1958 | Smith | 24/279 |
| 2,897,568 | 8/1959 | Hoke | 138/99 X |
| 2,998,629 | 9/1961 | Smith | 24/279 |
| 3,584,353 | 6/1971 | Smith | 24/279 |
| 3,189,970 | 6/1965 | Barr | 24/284 |
| 3,204,665 | 9/1965 | Faint | 138/99 |

*Primary Examiner*—Donald A. Griffin
*Attorney*—Roger W. Erickson and Owen, Wickersham & Erickson

[57] ABSTRACT

An improved pipe clamp comprised of rigid lugs fixed to the ends of a flexible band and fabricated from formed elements made of rolled or extruded metal stock. Each lug is comprised of a lug bar that retains one end of the clamp band. One or more U-shaped elements, welded to the lug bar have finger portions that extend perpendicular to it and engage the lug bar of the opposing lug. The U-shaped elements on different embodiments may have separable transverse portions to allow a drop-in bolt feature.

12 Claims, 9 Drawing Figures

FIG_1
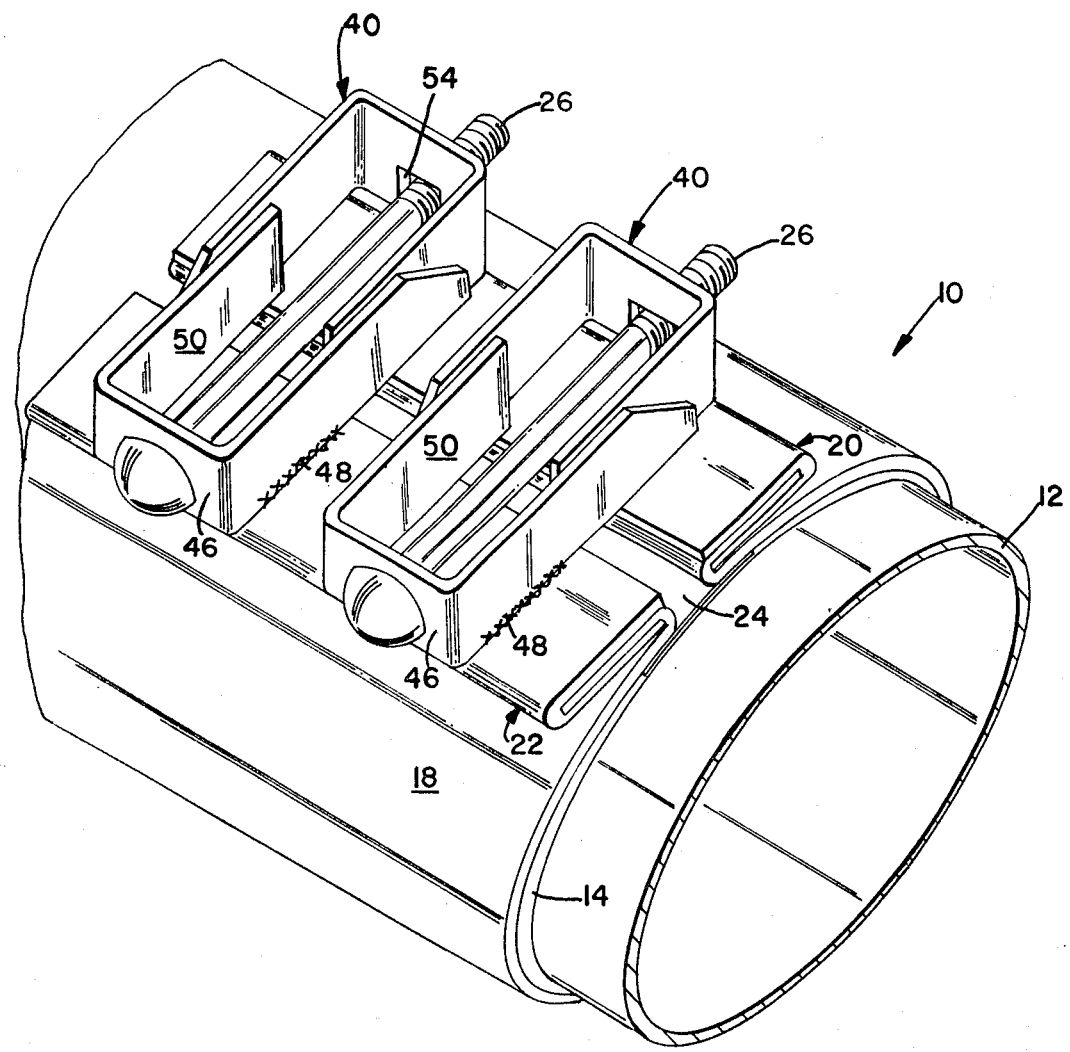

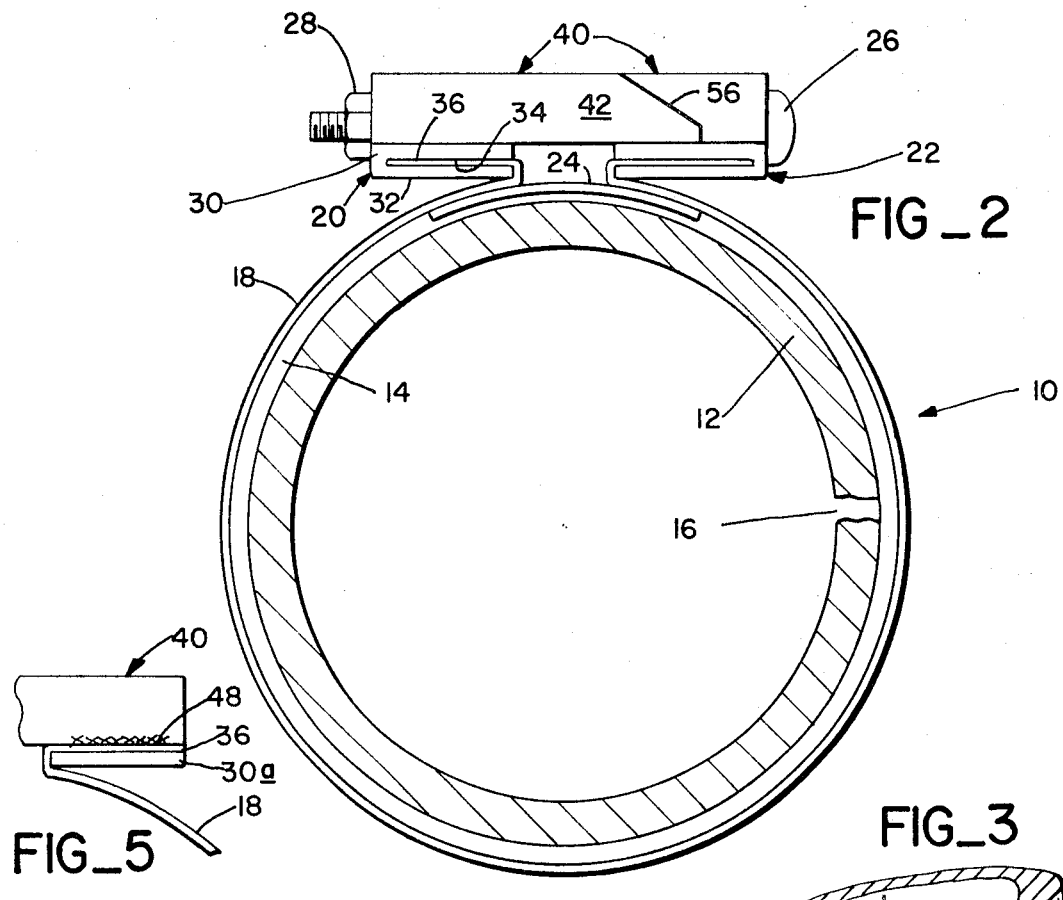
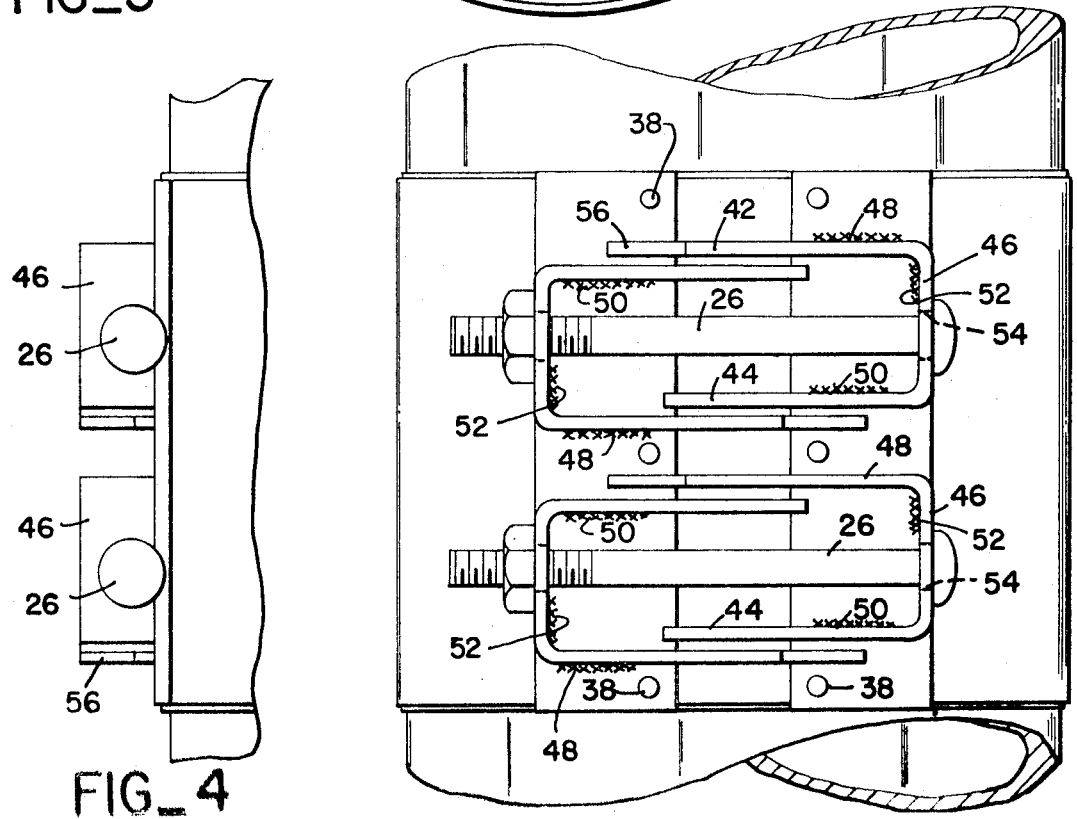

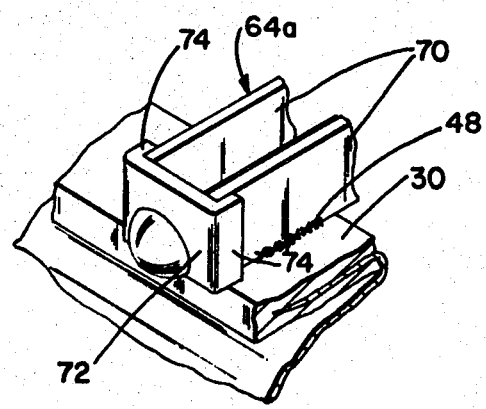
FIG_8
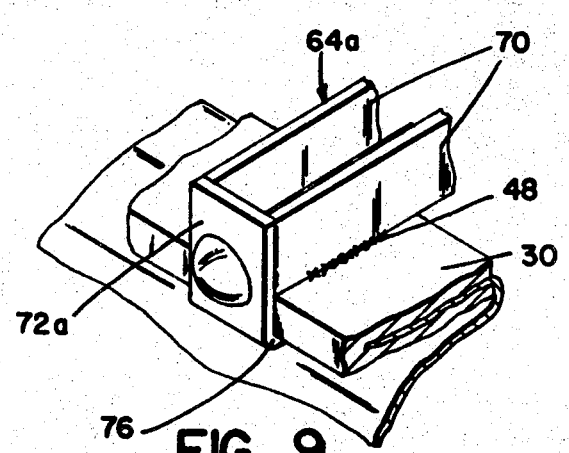
FIG_9
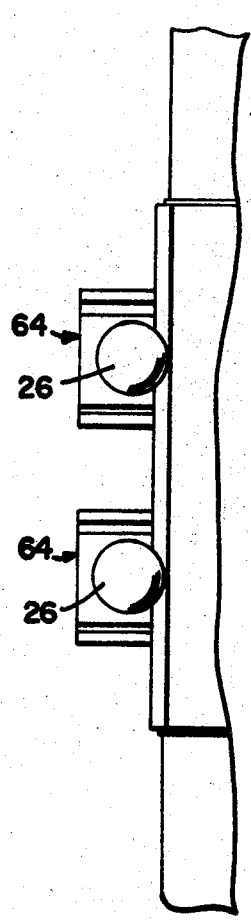
FIG_7
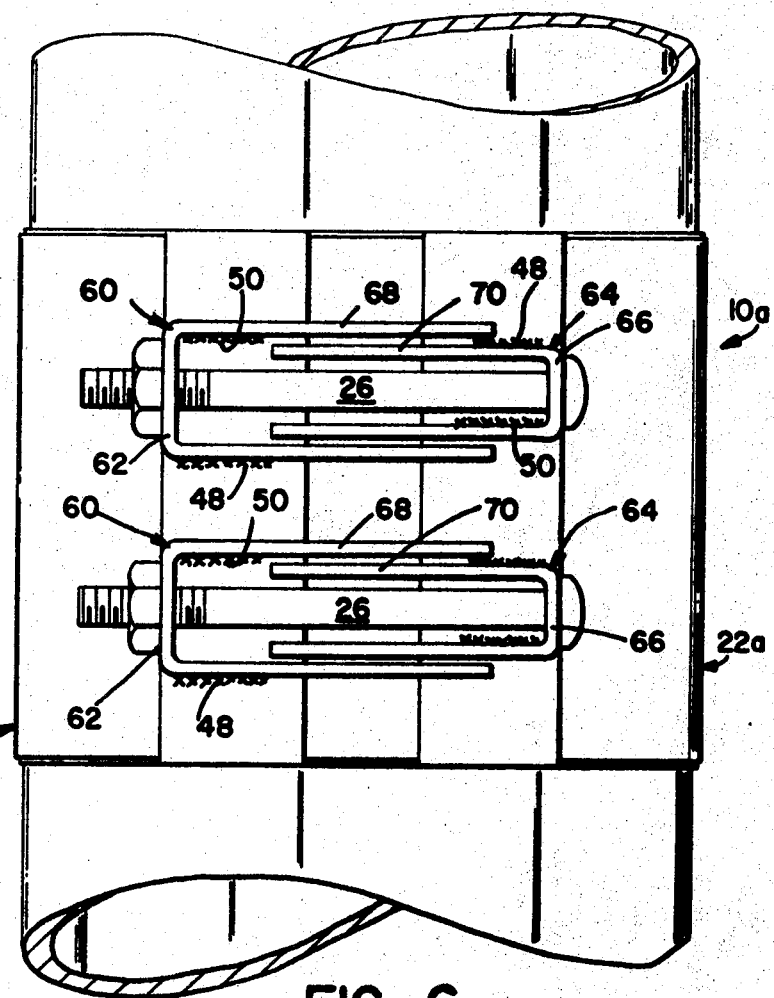
FIG_6

PIPE CLAMP MADE OF NON-CAST MATERIALS

This invention relates to improvements in pipe clamps and more particularly it relates to lugs for such clamps that are fabricated using elements formed from rolled or extruded metal stock as opposed to elements formed by casting or molding parts in the manner heretofore prevalent in the prior art.

Pipe clamps generally comprising a flexible band with rigid lugs at the ends of the band which are drawn together by bolts have long been used to stop leaks in pipes, particularly in water conduits. Heretofore, the lugs were made as castings from a suitable metal and included jaw-like portions adapted to grip the ends of the sheet metal bands. Also, it was found that extended finger-like portions on the lugs were beneficial to help stabilize the lugs and prevent them from tipping when the bolts were tightened. In order to provide both jaw portions and finger portions on the lugs, a fairly intricate casting mold was required. Even with the most efficient mold design and casting techniques, the yield rates of acceptable lug castings were not one hundred percent. Also, hidden defects such as internal bubbles or "holidays" often were formed but went undetected and in later use caused the lugs to fail or deteriorate prematurely after being installed.

One object of the present invention is to provide an improved pipe clamp utilizing lugs that are fabricated from rolled or extruded metal and which therefore overcomes the problems and disadvantages of cast lugs.

Another object of the present invention is to provide a pipe clamp that will withstand a high degree of band tension by its jaw portions without allowing the band to slip, that will provide a wide take-up range thereby enabling to accommodate pipes with different diameters, and that will remain stable without tipping even though high bolt loads are applied to obtain adequate band tension.

Yet another object of the present invention is to provide an improved pipe clamp that is particularly well adapted for ease and economy of manufacture.

Still another object of the present invention is to provide a pipe clamp that is particularly corrosion resistant. In pipe clamps which are to be installed underground it is highly desirable if not essential to eliminate the use of dissimilar metals which enhance electrolytic corrosion. This was a difficult problem with previous clamps since the cast lugs were a different metal from the band metal. Thus, such lugs had to be painted or coated to prevent the electrolytic corrosive action between the lugs and the band. The present invention eliminates this problem without the need for painting.

The aforesaid and other important objects are accomplished by a pipe lug structure comprised of elements made from a tough corrosion resistant rolled, extruded or forged metal which are cut and formed to a predetermined shape and then fabricated as by welding. Essentially, each lug is comprised of a lug bar that extends parallel to the centerline of the pipe being repaired and has a channel shaped cross section. One end of the flexible band for the clamp fits within and is spot welded to the lug bar. Extending upwardly from the upper surface of the lug bar and welded thereto is one or more bolt retaining and stabilizing members having a generally U-shaped configuration forming a pair of finger-like portions connected together by a transverse portion at one end. The transverse portion has an opening large enough to receive the shank diameter of a clamp tightening bolt and when two lugs of a clamp are opposed in their normal manner the head of a bolt and its threaded end are retained within the transverse portions of the opposed lugs. Thus, in one embodiment the two lugs may be exactly alike so that only one lug configuration is required for each clamp.

Other objects, advantages and features of our invention will become apparent from the following detailed description taken in conjunction with the drawing, in which:

FIG. 1 is a view in perspective of a pipe clamp embodying the principles of the present invention;

FIG. 2 is a view in elevation of the pipe shown in FIG. 1;

FIG. 3 is a plan view of the pipe clamp shown in FIG. 1;

FIG. 4 is a fragmentary side view in elevation of the clamp shown in FIG. 1;

FIG. 5 is a fragmentary view in elevation showing a modified form of lug for my clamp;

FIG. 6 is a plan view showing another modified form of pipe clamp according to my invention;

FIG. 7 is a side view in elevation of the clamp shown in FIG. 6; and

FIGS. 8 and 9 are fragmentary views in perspective showing variable forms of the pipe clamp of FIG. 6.

With reference to the drawing, FIGS. 1 and 2 show a pipe clamp 10 as it appears when normally installed on a pipe 12 for stopping a leak through the wall of the pipe or for coupling the ends of two adjoining pipe sections. In the general arrangement shown, the pipe is surrounded with a flexible gasket 14 of some yieldable, rubber-like material which completely covers the break 16 in the pipe wall or the pipe joint. A flexible band 18 made of a malleable sheet metal extends over the gasket and its ends are attached to a pair of rigid lugs 20 and 22. The ends of the band also extend over an armour member 24, preferably made of sheet metal which covers a portion of or is embedded in the gasket 24 between the lugs 20 and 22. This armour plate helps to maintain gasket pressure on the pipe surface in the area between the lugs where the band is not present. Each pair of lugs 20 and 22 are drawn together by one or more bolts 26 each having a nut 28 which is tightened to apply tension to the band and thereby compress the gasket against the pipe surface.

In accordance with the present invention both lugs are fabricated from rolled or extruded metal components rather than from castings as heretofore used in the prior art. Each lug is comprised of a lug bar 30 formed from a flat piece of rolled or extruded steel that is bent into a channel shaped cross section to form two leg portions 32 with a slot-like space 34 between them. The ends of the band 18 are bent to form hook-like portions 36 and each of these hook-like portions is located within the slot-like space 34 of a lug bar. To secure the band firmly within the lug bar, the three layers of metal are spot welded at intervals along each bar. Such spot welds, designated by the numeral 38 are best shown in FIG. 3.

For some applications, a lug bar 30a having only a single leg portion may be used, as shown in FIG. 5. In this instance, the hooked end 36 of the band is located on top of the lug bar and spot welded.

Attached to the lug bar of each lug is a bolt retaining and stabilizing element 40. This element is also formed from rolled or extruded non-cast metal material of a sufficient thickness to provide a high degree of strength and rigidity. In plan view, as shown in FIG. 3, each of these elements 40 is U-shaped with a pair of long and short fingers 42 and 44 that are generally parallel and connected together at one end by a transverse portion 46. These elements 40 may be made in high volume production from metal strip stock having a rectangular cross section. The strip stock is first cut to the desired length, then bent to the desired U-shape and thereafter punched to provide a bolt opening. Each element 40 is welded to the top surface of a lug bar to secure it in place. Preferably, weldments 48 and 50 are made on at least one side of each finger, and a small weldment 52 may also be used on the transverse portion 44. An electrical arc welding technique is particularly efficient for this purpose using an electrical pencil-like electrode that fuses the metal of the adjoining elements themselves without the need for a welding rod. This further enchances the corrosion resistance factor of the lugs because no dissimilar metal is fixed to it which can cause electrolytic action.

In the embodiment shown in FIG. 5, the element 40 rests directly on the hooked-band portion 36 covering th lug bar 30a and the weldments 48 and 50 along the bottom edges of the element 40 extend through the band into the lug bar.

An opening 54, as shown in FIG. 3, is located in the transverse lug portion 46 to receive a bolt 26 and the material surrounding this opening provides a bearing surface for either the bolt head or the tightening nut 28.

The typical pipe clamp 10 shown in the drawing has two bolt retaining elements 40 on a pair of lug bars 30, but it should be apparent that any number of such elements can be used depending on the required length of the clamp.

In the embodiment of FIGS. 1 – 4, the lugs 20 and 22 are identical and when the clamp is installed, the shorter finger 44 of each bolt stablizing member extends between the fingers 42 and 44 of the equivalent member on the opposing lug. The longer finger 44 of each lug is spaced just outside the short finger of the elements 40 on the opposing lug as seen in FIG. 3. Preferably, the ends of the longer fingers on all of the elements 40 have an upwardly sloping or beveled end surface 56. This allows the fingers to be long enough so as to engage the lug bar of the opposed lug to commence their stabilizing function even when the lugs are relatively far apart before their bolts are fully tightened. Yet, when the lugs are close together the beveled ends 56 will not interfere with the tightening of the nuts 28.

In a somewhat modified form of our invention, as shown in FIGS. 6 – 9, a clamp 10a is comprised of lugs 20a and 22a which have different configurations. Here, both lugs utilize U-shaped bolt retaining members but one lug has a bolt retaining member 60 with a larger transverse portion 62 than the similar U-shaped member 64 with a small transverse portion 66 on the other lug. Thus, when the clamp is installed both fingers 68 of the member 60 extend parallel to but outside of the fingers 70 of the opposite lug. Openings are provided in the transverse portions 62 and 66 so that the bolts extend between them and parallel to the lug fingers.

The U-shaped elements 60 and 64 for the lugs 20a and 22a are both made of the same material and are attached by welding in the same manner to the lug bars as the identical U-shaped elements 40 for the lug embodiment of FIG. 1.

As shown in FIGS. 8 and 9, the clamp 10a may be readily modified to provide a "drop-in" bolt feature which will increase the speed and convenience of installing the clamp on a pipe. Here, the smaller U-shaped element 64a is essentially comprised of two shorter fingers 70 that are parallel and spaced apart plus a removable retainer washer. As shown in FIG. 8, a retainer washer 72 is provided which has flanges 74 on opposite sides that fit around the outside surface of the fingers 70. These latter flanges serve to hold the washer in place and also provide some support against any side loads on the fingers. In FIG. 9, a somewhat different washer 72a is shown having a flange 76 on its bottom edge that fits under the lug bar and helps to hold the bolt in place as it is tightened. In either case, the retainer washers have an opening through which the bolt extends while the area of strong durable material around this opening affords an ample bearing surface for the bolt head.

From the foregoing it should be apparent that the present invention provides an improved pipe clamp having a high degree of strength and durability. In addition, our clamp includes the desired functional features of a large range of adjustment to accommodate differences in pipe sizes, lug stabilizing fingers that prevent bolt bending and allow a high degree of gasket pressure so that leak prevention can be assured even under severe conditions. Moreover, since all of the clamp elements can be made of the same non-cast metal material such as stainless steel, the clamp will be highly corrosion resistant and will retain its structural integrity for a long period of use underground. In addition, the use of extruded or rolled metal stock exclusively enables out clamp to be formed and fabricated in large volume production at low unit cost.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a pipe clamp of the type having a malleable band with ends secured in a pair of lugs adapted to be tightened together by bolts and nuts, each of said pair of lugs comprising:

an elongated lug bar adapted to extend parallel to the centerline of a pipe being repaired, said bar being made from a strip of non-cast metal having a planar upper surface and fixed to one end of said malleable band;

a bolt retaining member made from a strip of non-cast metal stock that is bent to a U-shaped configuration with parallel, spaced apart fingers connected at one end by a transverse portion, at least one of said fingers being long enough to extend beyond the inner edge of said lug bar and contact the upper surface of the lug bar of the opposing lug member of the clamp, weldments along the bottom edges of said fingers adjacent said transverse portion for securing said bolt retaining member to said upper surface of said lug bar, said transverse portion having an opening for receiving the shank of a bolt.

2. The pipe clamp as described in claim 1 wherein said fingers have different lengths.

3. The pipe clamp as described in claim 2 wherein the end of the longest finger of each bolt retaining member has a surface that slopes upwardly toward the closed end of the member.

4. The pipe clamp as described in claim 1 wherein said fingers and said lug bars are stainless steel.

5. The pipe clamp as described in claim 1 wherein said opening in said transverse portion is closer to one finger so that the openings of opposed lugs of the clamp will be aligned when the finger of one lug is located between the fingers of the opposed lug.

6. The pipe clamp as described in claim 1 wherein said lug bar is channel shaped in cross section to form parallel legs having a space between to receive a hooked end portion of said malleable band, and spot welds connecting one said leg to said band at spaced apart intervals along the lug bar.

7. The pipe clamp as described in claim 1 wherein said lug bar has a generally rectangular shaped cross section with a top surface that supports a hooked end portion of said malleable band, and spot welds connecting said lug bar and said hooked end portion.

8. The pipe clamp as described in claim 1 wherein said bolt retaining member on one lug has finger portions that are spaced closer together than the wider spaced apart finger portions of the opposed lug so that they extend within said wider spaced apart finger portions as the opposed lugs are brought together.

9. A pipe clamp comprising in combination:
a band of malleable sheet metal adapted to fit around a pipe and having hooked end portions;
a pair of rigid lugs fixed to said hooked end portions of said band, each said lug including a lug bar having a substantially rectangular cross section and welded to one of said hooked end portions of said band, at least one bolt retaining member on each said lug bar formed by a strip of non-cast metal and bent to generally a U-shaped configuration with parallel spaced apart fingers that are connected at one end by a transverse portion, weldments along the bottom edges of said fingers adjacent to said transverse portion for securing each said bolt retaining member to its said lug bar, each said transverse portion having an opening, and bolt means extending through aligned said openings of the retaining members on opposed lugs, said fingers extending from each said lug bar to engage the upper surface of the lug bar on the opposed lug when said bolt means are tightened.

10. The pipe clamp as described in claim 9 wherein the fingers on one of said lugs are closer together than the wider fingers on the other lug and are spaced inside of the wider fingers when the lugs are brought together to tighten the band.

11. In a pipe clamp of the type having a malleable band with ends secured in a pair of lugs adapted to be tightened together by bolts and nuts, each of said pair of lugs comprising:
an elongated lug bar made from a strip of non-cast metal and adapted to extend parallel to the centerline of a pipe being repaired and fixed to one end of said malleable band;
a bolt retaining member made from a strip of non-cast metal stock in a U-shaped configuration with parallel, spaced apart fingers connected at one end by a transverse portion, the bottom edges of said fingers being welded to said lug bar, said transverse portion comprising a separable retainer washer that interconnects its fingers having a central opening to receive a bolt and an integral flange portion that extends under the lug bar when the bolt is positioned properly between fingers, whereby said washer is removable from said fingers so that the bolt can be dropped in place during installation of the clamp.

12. A pipe clamp comprising in combination:
a band of malleable sheet metal adapted to fit around a pipe and having hooked end portions;
a pair of rigid lugs fixed to said hooked end portions of said band, each said lug including a lug bar having a substantially rectangular cross section and welded to one of said hooked end portions of said band, at least one bolt retaining member on each said lug bar formed of non-cast metal and bent to generally a U-shaped configuration with parallel spaced apart fingers that are connected at one end by a transverse portion, weldments along the bottom edges of said fingers adjacent to said transverse portion for securing each said bolt retaining member to its said lug bar, each said transverse portion having an opening, and bolt means extending through aligned said openings of the retaining members on opposed lugs, one of said fingers on each said bolt retaining member being longer than the outer finger and having a beveled end, said opening in said transverse portion being nearer to one finger than the other finger so that when said openings in both lugs are aligned the smaller finger of each bolt retaining member is located between the fingers of the bolt retaining member on the opposed lug, said fingers extending from each said lug bar to engage the upper surface of the lug bar on the opposed lug when said bolt means are tightened.

* * * * *